(12) United States Patent
Guillemont

(10) Patent No.: US 11,073,043 B2
(45) Date of Patent: Jul. 27, 2021

(54) DEFLECTOR FOR THE FAIRING OF A TURBOMACHINE PINION, ASSOCIATED GEAR BOX AND TURBOMACHINE

(71) Applicant: SAFRAN TRANSMISSION SYSTEMS, Colombes (FR)

(72) Inventor: Maxence Gérard Claude Guillemont, Moissy Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 16/733,855

(22) Filed: Jan. 3, 2020

(65) Prior Publication Data
US 2020/0217222 A1    Jul. 9, 2020

(30) Foreign Application Priority Data
Jan. 4, 2019 (FR) ...................... 1900057

(51) Int. Cl.
*F01D 15/12* (2006.01)
*F01D 25/24* (2006.01)
(Continued)

(52) U.S. Cl.
CPC .............. *F01D 25/24* (2013.01); *F04D 29/06* (2013.01); *F04D 29/5806* (2013.01)

(58) Field of Classification Search
CPC .......... F01D 25/24; F01D 25/18; F04D 29/06; F04D 29/5806; F04D 13/0646;
(Continued)

(56) References Cited

U.S. PATENT DOCUMENTS 2,017,871 A * 10/1935 Strain ................. F16H 57/0463
                                                   184/109
3,712,760 A *  1/1973 Furlong .................. F04D 25/02
                                                   417/424.2
(Continued)

FOREIGN PATENT DOCUMENTS

EP     1 610 036 A2    12/2005
EP     3 346 099 A1     7/2018

OTHER PUBLICATIONS

Search Report and Written Opinion as issued in French Patent Application No. 1900057, dated Oct. 29, 2019.

*Primary Examiner* — Jason D Shanske
(74) *Attorney, Agent, or Firm* — Pillsbury Winthrop Shaw Pittman LLP

(57) ABSTRACT

A deflector for the fairing of a pinion, which includes a teething, a barrel and a wall positioned between the teething and the barrel, the deflector extending around an axis and including an envelope of which the shape and the dimensions are suited to surrounding at least one part of the teething of the pinion, the deflector including an oil injection circuit including a first portion provided on an outer surface of the envelope, a first injection hole provided in the envelope and communicating with the first portion of the oil injection circuit, the first injection hole emerging on an inner surface of the envelope so as to inject oil in the direction of the pinion, a second portion communicating with the first portion, the second portion including a second injection hole intended to be facing the inside of the barrel of the pinion.

9 Claims, 4 Drawing Sheets

(51) Int. Cl.
*F04D 29/06* (2006.01)
*F04D 29/58* (2006.01)

(58) Field of Classification Search
CPC ............. F16H 57/0423; F16H 57/0456; F16H 57/0421; F05D 2260/98
USPC ...................................................... 415/122.1
See application file for complete search history.

(56) References Cited

U.S. PATENT DOCUMENTS

| | | | |
|---|---|---|---|
| 2006/0054408 A1* | 3/2006 | Swainson | F16H 57/0493 |
| | | | 184/6.12 |
| 2010/0140019 A1 | 6/2010 | Imai et al. | |
| 2011/0299974 A1* | 12/2011 | Gauthier | F02C 3/107 |
| | | | 415/122.1 |
| 2014/0260790 A1* | 9/2014 | Passino | F16H 57/0409 |
| | | | 74/606 R |
| 2015/0097073 A1* | 4/2015 | McPeak | F16H 57/0423 |
| | | | 244/17.11 |
| 2016/0138476 A1* | 5/2016 | Lemarchand | F02C 7/32 |
| | | | 415/213.1 |
| 2017/0146112 A1* | 5/2017 | Anglin | F16H 57/0495 |
| 2018/0023684 A1* | 1/2018 | Anglin | F16H 57/0421 |
| | | | 74/423 |
| 2018/0187770 A1* | 7/2018 | Anglin | F02C 7/32 |
| 2019/0293026 A1* | 9/2019 | Uhkoetter | F02C 7/36 |

* cited by examiner

DEFLECTOR FOR THE FAIRING OF A TURBOMACHINE PINION, ASSOCIATED GEAR BOX AND TURBOMACHINE

CROSS REFERENCE TO RELATED APPLICATIONS

This application claims priority to French Patent Application No. 1900057, filed Jan. 4, 2019, the entire content of which is incorporated herein by reference in its entirety.

FIELD

The invention relates to the general field of turbomachines.

The invention more specifically pertains to a deflector used for the fairing of a turbomachine pinion, for example a pinion used in a gear box of the turbomachine. Moreover, the invention relates to a turbomachine comprising such a deflector.

BACKGROUND

In turbomachines, part of the power generated is used to drive different accessories, necessary for the operation of the turbomachine or the aircraft, such as an electric generator, a lubrication pump or a fuel pump.

To this end, the turbomachine generally comprises an inlet gear box (IGB), a radial drive shaft (RDS), a transfer gear box (TGB) and an accessory gear box (AGB) supporting the different accessories.

When the drive shaft is rotationally driven, it mechanically drives the different accessories through the IGB, the RDS, the TGB then the AGB. The IGB and the TGB ensure an angular gear which makes it possible to go from a longitudinal rotation system to a transversal rotation system on a same machine by gearing mechanisms.

In order to ensure the lubrication and the cooling of the gearings of the IGB and the TGB, it is known to use spray nozzles to project cold oil in the direction of the pinions of the gearing mechanisms.

Moreover, in order to avoid problems of churning and splashing, the pinions are generally shrouded by a sheet metal deflector that ensures the separation of the air stream generated by the rotation of the pinions, from the suction forces of an oil recovery device.

FIG. 1 illustrates a sectional view of an example of gearing mechanism in a turbomachine gear box.

With reference to FIG. 1, a conical pinion 10 is meshed with another conical pinion (not represented) to form an angular gear. The pinion 10 comprises a teething 11, a barrel 12 and a wall 13 positioned between the teething 11 and the barrel 12.

A deflector 15, fixed to the casing 17 of the gear box, shrouds a part of the teething 11 of the pinion 10. Moreover, spray nozzles 16, also fixed to the casing 17, project cold oil in the direction of the teething 11 as well as to the inside of the barrel 12 of the pinion 10.

In order to ensure correctly the fairing and the lubrication of the pinion 10, the deflector 15 and the spray nozzles 16 must be positioned as close as possible to the pinion 10. Moreover, the spray nozzles 16 must be oriented along a direction suited to targeting the teething 11 and the inside of the barrel 12 of the pinion 10.

This leads to difficulties during mounting in the gear box because the deflector and the spray nozzles must be positioned close spatially to the pinion in a reduced space.

SUMMARY

In this context, an aspect of the invention aims to overcome all or part of the drawbacks of the prior art identified above, notably by proposing a solution making it possible to ensure the fairing and the lubrication of a turbomachine pinion of which the mounting is simplified.

Thus, according to a first aspect, the invention relates to a deflector for the fairing of at least one turbomachine pinion, the at least one pinion comprising a teething, a barrel and a wall positioned between the teething and the barrel, the deflector extending around an axis and comprising an envelope of which the shape and the dimensions are suited to surrounding at least one part of the teething of the pinion, the deflector comprising an oil injection circuit comprising:
  a first portion provided on an outer surface of the envelope,
  at least one first injection hole provided in the envelope and communicating with the first portion of the oil injection circuit, the at least one first injection hole emerging on an inner surface of the envelope so as to inject oil in the direction of the pinion,
  a second portion communicating with the first portion, the second portion comprising at least one second injection hole intended to be facing the inside of the barrel of the pinion.

The invention according to the first aspect makes it possible to resolve the aforementioned problems.

Indeed, in addition to the fairing of the pinion, the deflector according to the invention ensures the lubrication and the cooling of the pinion.

Thus, the use of such a deflector makes it possible to reduce the number of parts in the turbomachine and thus the mass of the turbomachine while simplifying the mounting operations.

In addition, in so far as the first injection hole is directly provided in the envelope surrounding the teething of the pinion, the length of the oil jet is shorter. This makes it possible to be free of the targeting requirements imposed by the use of spray nozzles according to the prior art.

Moreover, it is possible to arrange a plurality of first injection holes communicating with the oil injection circuit in such a way as to ensure the lubrication and the cooling of the teething of the pinion over its entire width.

Furthermore, by bringing the first injection hole closer to the teething of the pinion, oil can reach the teething of the pinion even during the start-up of the turbomachine where the rotational speed of the turbomachine and thus the oil pressure are low. Indeed, with spray nozzles of the prior art, it is not possible during the start-up of the turbomachine to target correctly the teething of the pinion because the oil pressure is not sufficient. Thus, the deflector according to the invention makes it possible to avoid the premature degradation of the pinion.

Finally, the deflector according to the invention makes it possible to inject, with an optimised flow rate, oil in the direction of the pinion not just on meshing, to form a film of oil facilitating the contact with another pinion, but also on unmeshing, to dissipate the calories introduced by the contact mechanics, whereas with a conventional spray nozzle, the injection of oil can take place either on meshing or on unmeshing.

In addition, thanks to the second portion of the fluid injection circuit, the deflector also ensures the lubrication of the inside of the barrel of the pinion.

The deflector according to the first aspect of the invention may also have one or more of the characteristics below, considered individually or according to all technically possible combinations thereof.

According to a non-limiting embodiment, the at least one first injection hole is intended to emerge facing the teething of the pinion.

According to a non-limiting embodiment, the at least one first injection hole and the at least one second injection hole have a diameter comprised between 0.5 and 5 mm.

According to a non-limiting embodiment, the first portion and the second portion of the oil injection circuit form a pipe provided with a bend at the level of a connecting junction between the first portion and the second portion.

According to a non-limiting embodiment, the pipe, formed by the first portion and the second portion of the oil injection circuit, is connected to a lubrication circuit connected to a lubrication pump.

According to a non-limiting embodiment, the envelope comprises a fastening flange having fastening orifices.

According to a non-limiting embodiment, the fastening flange is scalloped.

Furthermore, according to a second aspect, the invention relates to a turbomachine gear box comprising at least a pinion and a deflector according to the first aspect, the deflector fairing the pinion.

According to a non-limiting embodiment, the pinion is conical.

According to a non-limiting embodiment, the pinion is cylindrical.

Furthermore, the invention according to a third aspect relates to a turbomachine comprising at least one deflector according to the first aspect of the invention.

BRIEF DESCRIPTION OF THE FIGURES

Other characteristics and benefits of the invention will become clear on reading the description that follows, with reference to the appended figures, which illustrate.

DETAILED DESCRIPTION

Figure 1:
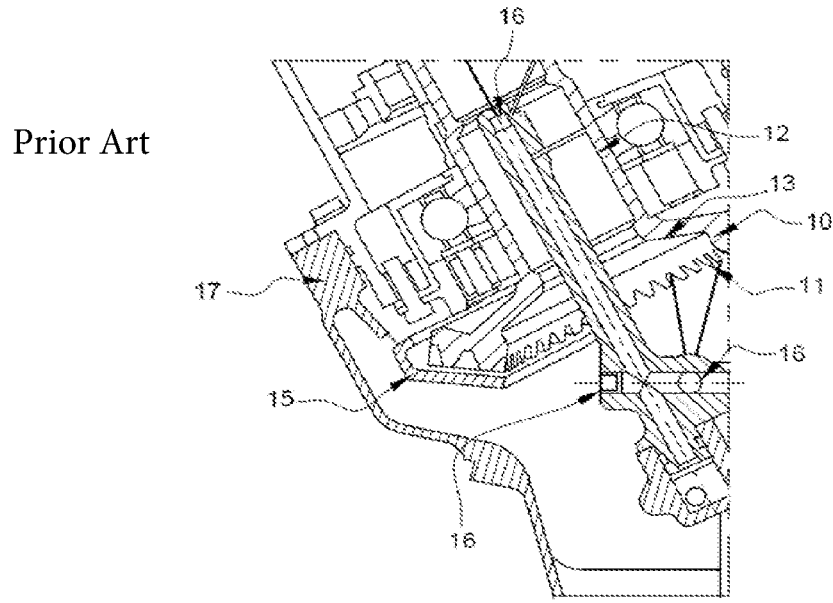
in FIG. 1, a longitudinal sectional view of a gearing mechanism according to the prior art, in FIG. 2, a longitudinal sectional view of a turbomachine being able to include one or more deflectors according to an embodiment of the invention, in FIG. 3, a perspective view of a deflector according to a first embodiment of the invention, in FIG. 4, a top view of a pinion of the turbomachine shrouded by the deflector illustrated in FIG. 3, in FIG. 5, a longitudinal sectional view of the pinion shrouded by the deflector illustrated in FIG. 4, in FIG. 6, a perspective view of a deflector according to a second embodiment of the invention, in FIG. 7, a longitudinal sectional view of a pinion of the turbomachine shrouded by the deflector illustrated in FIG. 6.
Figure 2:
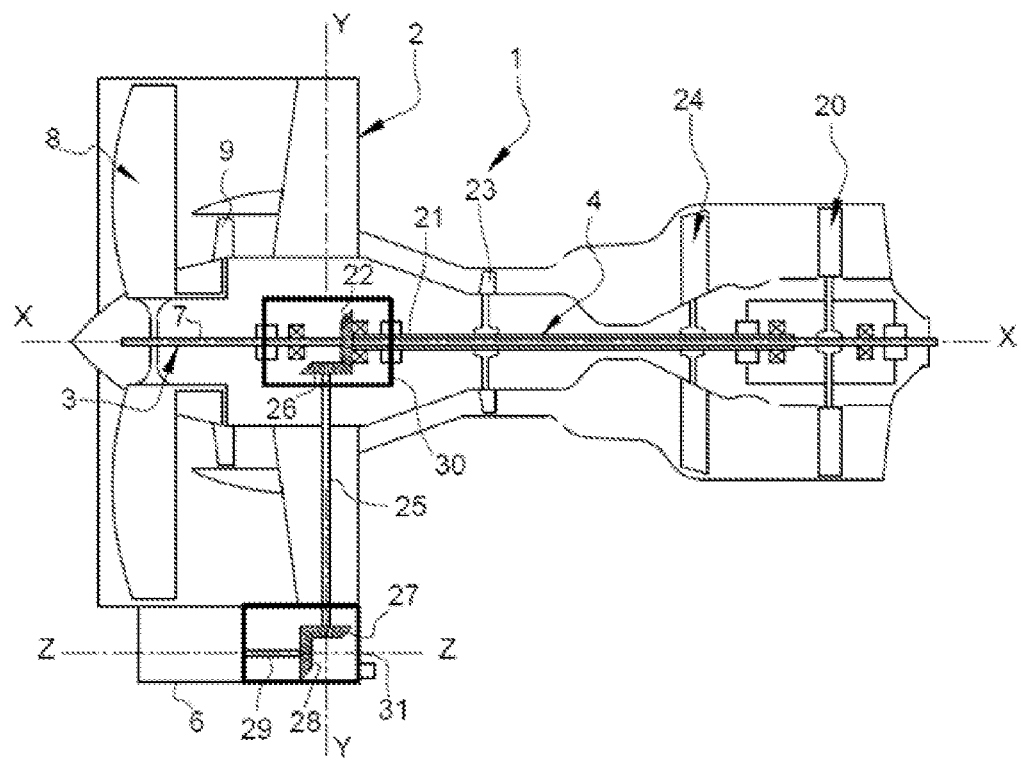

FIG. 2 represents in a schematic manner a longitudinal section of a dual flow turbomachine 1 in which at least one deflector 100 according to an embodiment of the invention may be integrated.

The turbomachine 1 of longitudinal axis X-X comprises a fan casing 2, a low pressure body 3, a high pressure body 4, a combustion chamber 5 and an accessory drive box 6.

In the remainder of the description, the terms "upstream" and "downstream" are used with reference to the normal direction of flow of the gaseous stream in the turbomachine 1.

The low pressure body 3 comprises a low pressure shaft 7 centred on the longitudinal axis X-X of the turbomachine 1, a fan 8 mounted on the upstream end of the low pressure shaft 7, a low pressure compressor 9 fixed on the fan 8, downstream thereof, and a low pressure turbine 20 mounted on the downstream end of the low pressure shaft 7.

The high pressure body 4 comprises a high pressure shaft 21 arranged concentrically around the low pressure shaft 7, an output pinion 22 mounted on the upstream end of the high pressure shaft 21, a high pressure compressor 23 mounted on the high pressure shaft 21, downstream of the output pinion 22, and a high pressure turbine 24 mounted on the downstream end of the high pressure shaft 21.

The compressors 9, 23 and turbines 20, 24 of the low pressure 3 and high pressure 4 bodies of the turbomachine 1 illustrated in FIG. 2 have been represented with a single stage of vanes in order to make them easier to understand.

The accessory gear box (AGB) 6, fixed under the casing of the fan 2 in the embodiment of FIG. 2, is rotationally driven by the high pressure shaft 21 via a radial drive shaft 25 and an input shaft 29 connected to the gear train of the AGB 6. In particular, the radial drive shaft 25 has an input pinion 26 mounted on its radially outer end, and an output pinion 27 mounted on its radially inner end, vis-à-vis the longitudinal axis X-X of the turbomachine 1. The output pinion 27 of the radial drive shaft 25 is meshed with an input pinion 28 mounted on a downstream end of the input shaft 29. It may be noted that in other embodiments, not represented, the AGB is positioned in the nacelle or instead in the so-called "core" zone of the turbomachine.

The output pinion 22 of the high pressure shaft 21 is meshed with the input pinion 26 of the radial drive shaft 25 forming an angular gear, and are housed in an inlet gear box (IGB) 30. Thanks to the meshing of the output pinion 22 of the high pressure shaft 21 with the input pinion 26 of the radial drive shaft 25, the rotation of the high pressure shaft 21 around the axis X-X drives a rotation of the radial drive shaft 25 around its axis of rotation Y-Y.

Furthermore, the output pinion 27 of the radial drive shaft 25 is meshed with the input pinion 28 of the input shaft 29 of the accessory gear box 6 forming form an angular gear, and are housed in a transfer gear box (TGB) 31. Thanks to the meshing of the output pinion 27 of the radial drive shaft 25 with the input pinion 28 of the input shaft 29, a rotation of the radial drive shaft 25 around the axis Y-Y causes a rotation of the input shaft 29 around its axis of rotation Z-Z.

In order to ensure correctly the lubrication and the cooling of the pinions 22, 26, 27 and 28 of the IGB and the TGB described previously while avoiding churning and splashing phenomena, a deflector 100 according to an embodiment of the invention is used to fair at least one of the pinions 22, 26, 27, 28. In an embodiment, all the pinions 22, 26, 27, 28 are shrouded by the deflector 100 according to the invention.

In the remainder of the description, the deflector 100 is described with reference to a pinion 10 which may as easily be the output pinion 22 of the high pressure shaft 21, the input pinion 26 of the radial drive shaft 25, the output pinion 27 of the radial drive shaft 25 or instead the input pinion 28 of the input shaft 29.

In the remainder of the description, the terms "axially" and "radially" are used to designate, respectively, an axis parallel and an axis perpendicular to the axis of rotation A of the pinion 10. Moreover, "interior" and "exterior" designate an arrangement, respectively, near to and far away from the axis of rotation A of the pinion 10.

Figure 3:
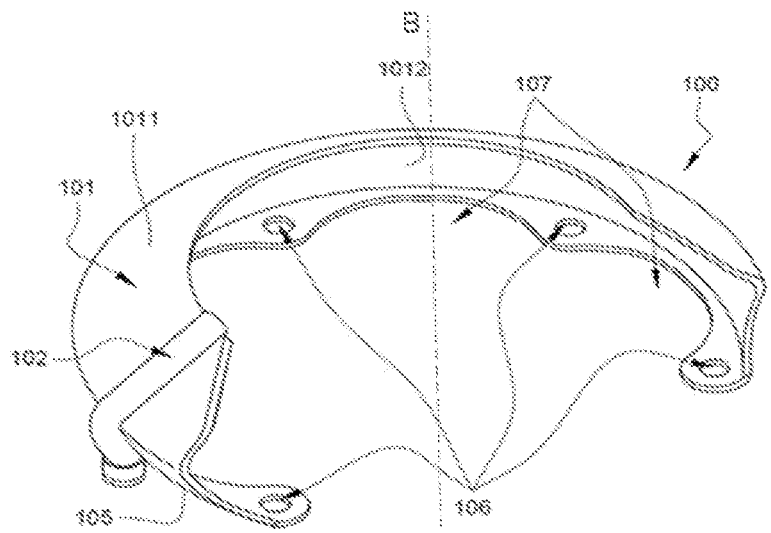

FIG. 3 is a perspective view of the deflector 100 according to a first embodiment of the invention.

Figure 4:
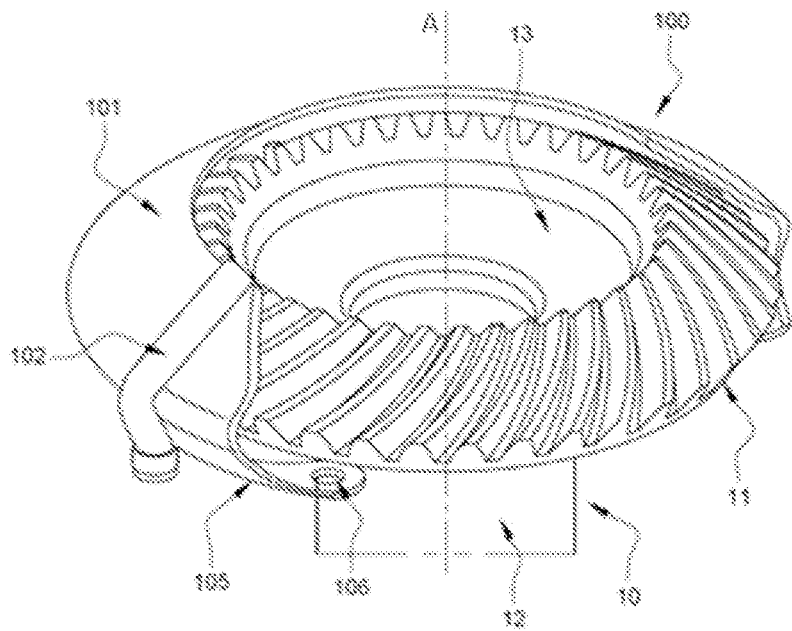

FIG. 4 is a top view of the pinion 10 shrouded by the deflector 100 illustrated in FIG. 3.

Figure 5:
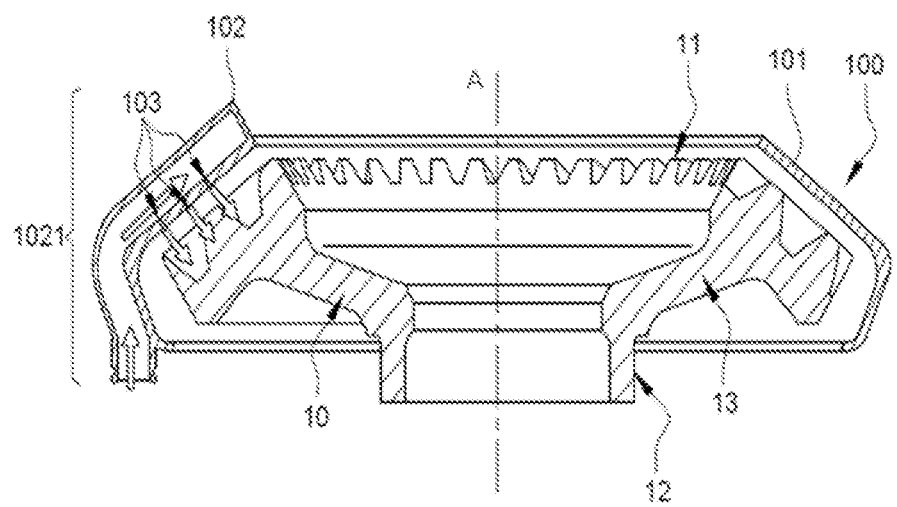

FIG. 5 is a longitudinal sectional view of the pinion 10 shrouded by the deflector 100 illustrated in FIG. 4.

The deflector 100 shrouds a conical pinion 10 of axis of rotation A. Naturally, the pinion 10 may have another shape, for example it may be a cylindrical pinion. Moreover, the pinion 10 has a teething 11, a barrel 12 and a wall 13 between the teething 11 and the barrel 12. In the embodiment illustrated in FIGS. 4, 5 and 7, the teething 11 is helicoidal, the barrel 12 is a hollow shaft and the wall 13 is tapered.

Furthermore, the deflector 100 comprises an envelope 101 extending around an axis B and having a shape and dimensions suited to surrounding a part of the teething 11 of the pinion 10. Indeed, the envelope 101 partially surrounds the teething 11 of the pinion 10 in such a way as not to impede the transmission of power between the pinion 10 and another pinion meshed with the pinion 10. To this end, the envelope 101 has the shape of a half-ring defining an inner housing suited to receiving a part of the teething 11. Moreover, the envelope 101 has an inner surface 1012, facing the teething 11 of the pinion 10 and an outer surface 1011.

The deflector 100 also comprises an oil injection circuit 102 which ensures the conveyance of oil in the direction of the pinion 10.

In particular, in order to ensure the lubrication and the cooling of the teething 11 of the pinion, the oil injection circuit 102 comprises:
 a first portion 1021,
 first injection holes 103.

The first portion 1021 of the oil injection circuit 102 is provided on the outer surface 1011 of the envelope 101. Beneficially, the first portion 1021 and the envelope 101 share a common wall.

The first injection holes 103, three in the embodiment of FIG. 5, are provided in the envelope 101. Moreover, the first injection holes 103 communicate with the first portion 1021 of the oil injection circuit 102 and emerge on the inner surface 1012 of the envelope 101 in such a way as to inject oil in the direction of the pinion 10. Beneficially, the first injection holes 103 are oriented along a direction suited to targeting the teething 11 of the pinion 10 and have for example a diameter comprised between 0.5 and 5 mm.

It will be appreciated that the oil injection circuit 102 may comprise less than three first injection holes 103. However, in an embodiment, the first portion 1021 of the oil injection circuit 102 comprises a plurality of first injection holes 103 in such a way as to be able to inject cold oil over the whole width of the teething 11.

Furthermore, in order to ensure the fastening of the deflector 100 onto a casing of the turbomachine (not represented), the envelope 101 comprises a fastening flange 105 which extends radially inwards, in the direction of the barrel 12 or the wall 13 of the pinion 10. The fastening flange 105 comprises fastening orifices 106 suited to receiving a fastener or fastening system, for example bolts, which ensure the making integral of the deflector 100 with the casing of the turbomachine 1.

Beneficially, the fastening flange 105 is scalloped, such that two successive zones pierced by a fastening orifice 106 are spaced apart by empty portions 107, making the deflector 100 lighter.

Figure 6:
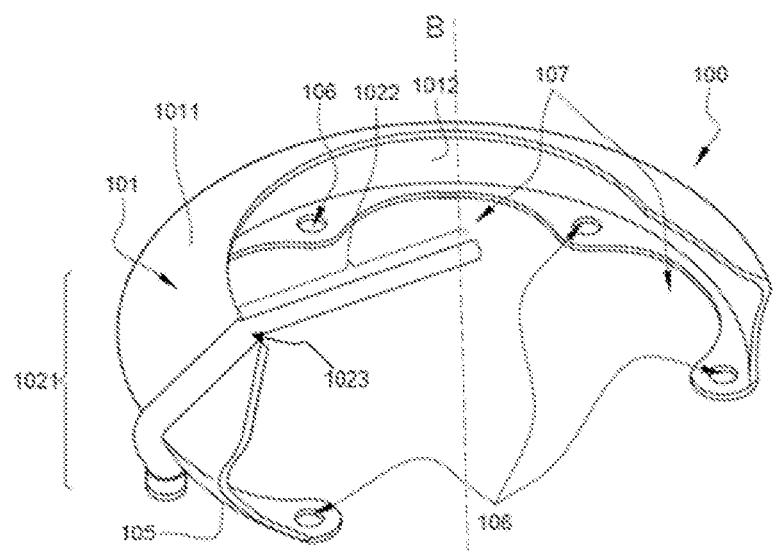
Figure 7:
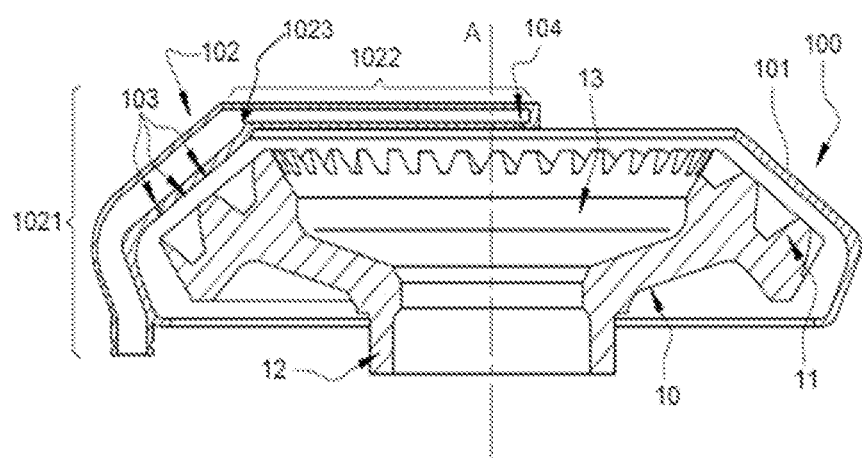

FIG. 6 is a perspective view of the deflector 100 according to a second embodiment of the invention, FIG. 7 is a longitudinal section view of the pinion 10 shrouded by the deflector 100 illustrated in FIG. 6.

The deflector 100 according to the second embodiment has the same characteristics as the deflector according to the first embodiment, with the difference that the oil injection circuit 102 comprises, in addition to the first portion 1021, a second portion 1022. Beneficially, the first portion 1021 and the second portion 1022 of the oil injection circuit 102 form a pipe connected to a lubrication circuit itself connected to a lubrication pump (not illustrated).

The second portion 1022 of the oil injection circuit 102 is cantilevered from the first portion 1021 and extends radially inwards such that a part of the second portion 102 is facing the inside of the barrel 12 of the pinion. Thus, the pipe formed by the first portion 1021 and the second portion 1022 of the oil injection circuit 102 is provided with a bend at the level of a connecting junction 1023 between the first portion 1021 and the second portion 1022

In order to ensure the projection of oil towards the inside of the barrel 12 of the pinion 10, at least one second injection hole 104 is provided in the second portion 1022. The second injection hole 104 is oriented in the direction of the inside of the barrel 12 of the pinion 10. It will be appreciated that a plurality of second injection holes 104 may be provided in the second portion 1022 of the oil injection circuit 102. Moreover, the second injection hole(s) 104 have for example a diameter comprised between 0.5 and 5 mm.

Furthermore, beneficially, the deflector 100 is made of metal alloy, for example an aluminium alloy, a steel alloy, an Inconel® type alloy or a titanium alloy.

Moreover, the deflector 100 according to an embodiment of the invention may be manufactured by an additive method which makes it possible to dimension the deflector 100 such that it hugs the shape of the pinion 10. In an alternative embodiment, the deflector 100 is manufactured by a mechanical-welding assembly method.

The invention claimed is:

1. A deflector for the fairing of at least one turbomachine pinion, said at least one turbomachine pinion comprising a teething, a barrel and a wall positioned between the teething and the barrel, the deflector extending around an axis and comprising an envelope of which the shape and the dimensions are suited to surrounding at least one part of the teething of the at least one turbomachine pinion, the deflector comprising an oil injection circuit comprising:
 a first portion provided on an outer surface of the envelope;
 at least one first injection hole provided in the envelope and communicating with the first portion of the oil injection circuit, said at least one first injection hole emerging on an inner surface of the envelope so as to inject oil in the direction of the at least one turbomachine pinion, and
 a second portion communicating with the first portion, said second portion comprising at least one second injection hole facing the inside of the barrel of the at least one turbomachine pinion.

2. The deflector according to claim 1, wherein said at least one first injection hole is configured to emerge facing the teething of the at least one turbomachine pinion.

3. The deflector according to claim 1, wherein said at least one first injection hole and said at least one second injection hole have a diameter comprised in the interval [0.5; 5 mm].

4. The deflector according to claim 1, wherein the first portion and the second portion of the oil injection circuit form a pipe provided with a bend at a connecting junction between the first portion and the second portion.

5. The deflector according to claim 1, wherein the envelope comprises a fastening flange having fastening orifices.

6. The deflector according to claim 5, wherein the fastening flange is scalloped.

7. A turbomachine gear box comprising at least one turbomachine pinion, and the deflector according to claim 1, said deflector fairing the at least one turbomachine pinion.

8. The turbomachine gear box according to claim 7, wherein the at least one turbomachine pinion is conical.

9. A turbomachine comprising at least one deflector according to claim 1.

* * * * *